United States Patent [19]

Noeami et al.

[11] 4,181,370

[45] Jan. 1, 1980

[54] FLUID PRESSURE CONTROL DEVICE FOR VEHICLE BRAKING SYSTEMS

[75] Inventors: Tomoyuki Noeami, Toyota; Hideyuki Hayashi, Mishima, both of Japan

[73] Assignee: Toyota Jidosha Kogyo Kabushiki Kaisha, Toyota, Japan

[21] Appl. No.: 879,857

[22] Filed: Feb. 22, 1978

[51] Int. Cl.² .............................................. B60T 8/14
[52] U.S. Cl. ................................ 303/24 F; 303/24 C; 188/352
[58] Field of Search ................... 303/6 C, 24 A, 24 C, 303/24 F; 188/352

[56] References Cited

U.S. PATENT DOCUMENTS

| 3,913,619 | 10/1975 | Aulner, Sr. et al. | 188/352 X |
| 3,937,523 | 2/1976 | Ayers, Jr. et al. | 303/6 C |
| 4,072,363 | 2/1978 | Nogami | 303/24 C |

FOREIGN PATENT DOCUMENTS 695582 8/1940 Fed. Rep. of Germany ........... 188/352

*Primary Examiner*—Stephen G. Kunin
*Attorney, Agent, or Firm*—Kenyon & Kenyon

[57] ABSTRACT

A fluid pressure control device comprises an inertia-controlled valve for interrupting the flow of fluid from a master cylinder to rear wheel brake cylinders when a ball is subjected to a deceleration in excess of a predetermined value. In the control device, a bypass passage is provided to permit direct fluid flow from a valve chamber into an outlet chamber, the valve chamber being in communication with an inlet chamber and containing the ball therein, and a check valve is disposed within the bypass passage to normally interrupt the direct flow of fluid from the valve chamber to the outlet chamber, the check valve being opened to cause the direct flow of fluid from the valve chamber to the outlet chamber when a pressure difference is produced between the valve chamber and the outlet chamber after the inertia-controlled valve is closed.

6 Claims, 4 Drawing Figures

FLUID PRESSURE CONTROL DEVICE FOR VEHICLE BRAKING SYSTEMS

BACKGROUND OF THE INVENTION

The present invention relates to fluid pressure control devices for vehicle braking systems, and more particularly to a fluid pressure control device of the type which comprises an inertia-controlled valve for interrupting the flow of fluid from a master cylinder to rear wheel brake cylinders when a ball is subjected to a deceleration in excess of a predetermined value.

SUMMARY OF THE INVENTION

The primary object of the present invention is to provide an improved fluid pressure control device wherein when a pressure difference is produced between a valve chamber and an outlet chamber after an inertia-controlled valve is closed, direct fluid flow is intermittently produced between the valve chamber and the outlet chamber to control the increase of wheel cylinder pressure.

Another object of the present invention is to provide an improved fluid pressure control device, having the above-mentioned characteristics, wherein a bypass passage is provide to permit the direct fluid flow from the upper portion of the valve chamber toward the outlet chamber, thereby to facilitate air-purge from the interior of the control device when brake fluid is being charged into the vehicle braking system.

According to the present invention, there is provided a fluid pressure control device for incorporation in a vehicle braking system between a master cylinder and wheel brake cylinders, which comprises:
- a housing provided with an inlet port for connection to the master cylinder, an outlet port for connection to the wheel brake cylinders, and a valve chamber communicating at one end thereof with the inlet port and at the other end thereof with the outlet port;
- a valve seat provided in the valve chamber to permit the flow of fluid between the inlet and outlet ports therethrough;
- an inertia-controlled ball located within the valve chamber to co-operate with the valve seat to cut off the flow of fluid from the inlet port to the outlet port when the ball is subjected to a deceleration in excess of a predetermined value;
- a bypass passage to permit direct fluid flow from the valve chamber into the outlet port; and
- a check valve disposed within the bypass passage to normally interrupt the direct flow of fluid from the valve chamber to the outlet port, the check valve being opened to cause the direct flow of fluid from the valve chamber to the outlet port when a pressure difference is produced between the valve chamber and the outlet port after the ball co-operates with the valve seat.

BRIEF DESCRIPTION OF THE DRAWINGS

The above and other objects, features and attendant advantages of the present invention will be more fully appreciated as the same becomes better understood from the following detailed description of preferred embodiments when considered in connection with the accompanying drawings in which.

DESCRIPTION OF THE PREFERRED EMBODIMENTS

Figure 1:
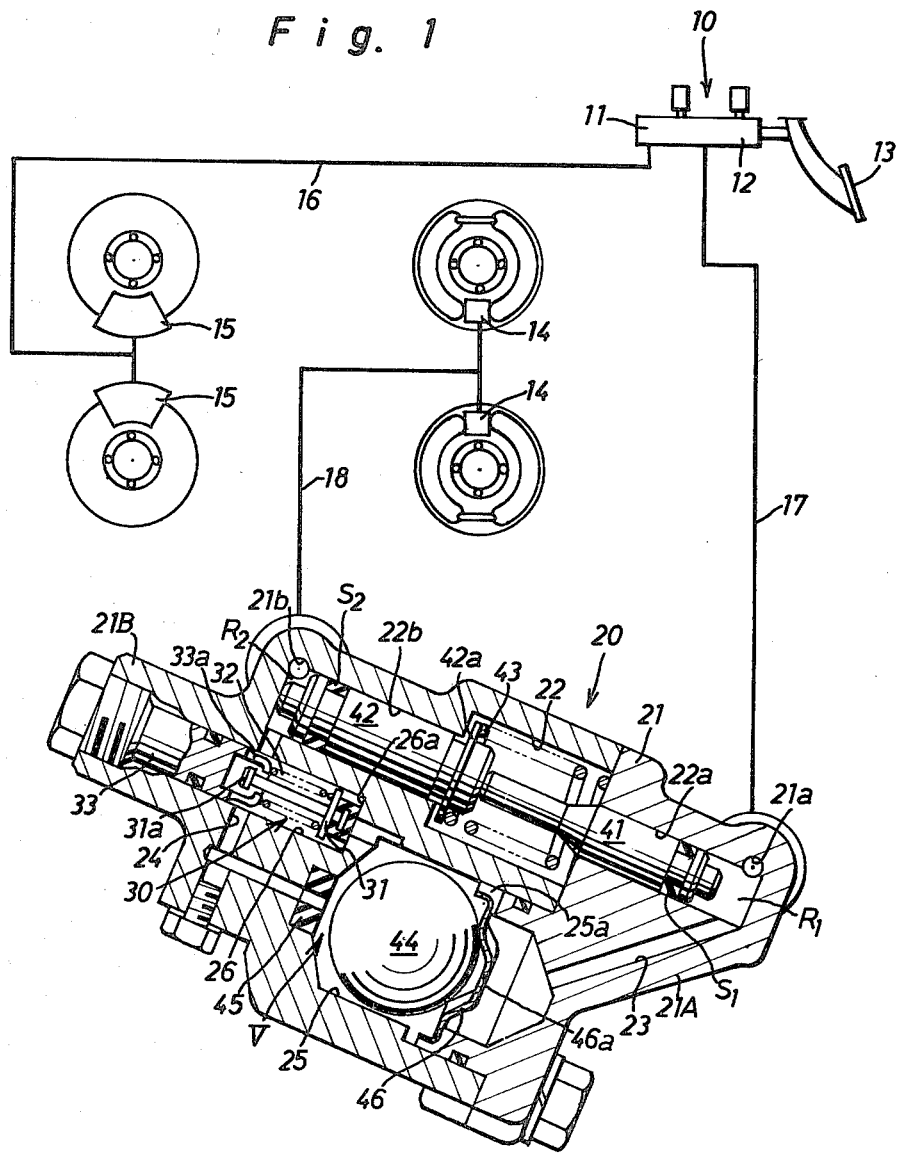
FIG. 1 illustrates a vehicle braking system including a fluid pressure control device in accordance with the present invention.

Referring now to the drawings, particularly in FIG. 1 there is illustrated a conventional tandem master cylinder 10 which is operated by depression of a foot brake pedal 13. The master cylinder 10 is provided with a front pressure chamber 11 connected to front wheel brake cylinders 15 by way of a conduit 16 and a rear pressure chamber 12 connected to rear wheel brake cylinders 14 by way of conduits 17 and 18. Interposed between the conduits 17 and 18 is a fluid pressure control device 20 in accordance with the present invention.

The control device 20 is fixedly mounted under the vehicle body floor at an inclined angle relative to the horizontal and comprises a housing assembly 21 which is provided therein with a small diameter piston 41, a large diameter piston 42 and an inertia-controlled ball 44. The housing assembly 21 includes a rear housing 21A provided thereon with an inlet port 21a and a front housing 21B provided thereon with an outlet port 21b. The inlet port 21a is connected to the rear pressure chamber 12 of the master cylinder 10 by way of the conduit 17. The outlet port 21b is connected to the rear wheel brake cylinders 14 by way of the conduit 18. Within the housing assembly 21, there are provided in parallel a stepped cylindrical bore 22 and a valve chamber 25. The stepped cylindrical bore 22 includes a small diameter portion 22a into which the inlet port 21a opens and a large diameter portion 22b into which the outlet port 21b opens. The valve chamber 25 communicates with the small and large diameter portions 22a and 22b of the stepped bore 22 by way of a first passage 23 and a second passage 24 respectively. The second passage 24 is also connected to the upper portion of the valve chamber 25 through a bypass passage 26, in which a check valve assembly 30 is provided to normally close the bypass passage 26.

The check valve assembly 30 comprises a valve seat 26a provided within the bypass passage 26 and a valve member 31 having a valve body co-operable with the valve seat 26a. The valve member 31 is biased toward the valve seat 26a by a compression coil spring 32, which is supported by lugs 33a of a screw plug 33. The screw plug 33 is adjustably threaded into the housing 21B and engageable at its lugs 33a with an enlarged portion 31a of the valve member 31. The check valve 30 is normally closed by engagement of the valve member 31 with the valve seat 26a to interrupt fluid flow from the valve chamber 25 to the second passage 24. When a pressure difference $P_0$ is produced between the valve chamber 25 and the second passage 24, as described in detail hereinafter, the valve member 31 is moved apart from the valve seat 26a against the resilient force of the spring 32 due to the pressure difference $P_0$ to permit direct fluid flow from the valve chamber 25 into the second passage 24. When the screw plug 33 is temporarily released outwardly, the valve member 31 is engaged at its enlarged portion 31a with the lugs 33a and retracted from the valve seat 26a to permit fluid flow from the valve chamber 25 into the second passage 24 when brake fluid is being charged into the vehicle braking system.

The small diameter piston 41 is reciprocably engaged within the small diameter portion 22a of the stepped bore 22 via an annular seal member $S_1$ to form a first fluid chamber $R_1$ into which the inlet port 21a opens directly. The first fluid chamber $R_1$ is connected to the valve chamber 25 by way of the first passage 23. The large diameter piston 42 is reciprocably engaged within the large diameter portion 22b of the stepped bore 22 via an annular seal member $S_2$ to form a second fluid chamber $R_2$ into which the outlet port 21b opens directly. The second fluid chamber $R_2$ is connected to the valve chamber 25 by way of the second passage 24. A compression coil spring 43 is interposed between an inner shoulder of the rear housing 21A and an annular flange 42a of the large diameter piston 42. Thus, the large diameter piston 42 is normally biased toward the second fluid chamber $R_2$ and abuts against the end wall of the stepped bore 22.

The inertia-controlled ball 44 located within the valve chamber 25 is free to roll forwardly up the inclined bottom of the valve chamber 25 and co-operates with an annular valve seat 45 secured to the side wall of the valve chamber 25 to provide a cut-off valve V. The ball 44 normally rests under gravity in the position shown in the drawing and is received by a support plate 46 which is secured to the inner wall of the rear housing 21A. The support plate 46 is formed with an orifice 46a. In braking operation, when the rate of deceleration caused by the application of the brakes exceeds a predetermined value, the ball 44 will roll forwardly due to the inertia force acting thereon toward the valve seat 45 so that the cut-off valve V is closed to interrupt fluid communication between the first and second fluid chambers $R_1$ and $R_2$.

When supplying brake fluid into the braking system with the control device 20, prior to supply of brake fluid the screw plug 33 is turned back to open the check valve 30 so that the upper portion of the valve chamber 25 is directly communicated with the second passage 24 by way of the bypass passage 26. Further, bleed plugs (not shown) provided on the rear wheel brake cylinders 14 are released. Under this condition, when the master cylinder 10 is operated by repeated depression of the brake pedal 13, brake fluid supplied into the rear pressure chamber 12 of the master cylinder 10 is delivered into the first fluid chamber $R_1$ of the control device 20 through the conduit 17 and the inlet port 21a. The supplied fluid then flows into the valve chamber 25 through the first passage 23, the orifice 46a and a hole 25a. The brake fluid in the valve chamber 25 then reaches the second fluid chamber $R_2$ through the valve seat 45 and the bypass passage 26 and flows into the rear wheel brake cylinders 14 through the outlet port 21b and the conduit 18 finally to be drained out from the bleed plugs. In this instance, occasionally the inertia-controlled ball 44 seats on the valve seat 45 by pressure of the brake fluid passing through the orifice 46a. In such a case, the fluid runs through the bypass passage 26 and the second passage 24.

During the fluid delivery process as mentioned above, due to the tangential positioning of the inlet port 21a at the upper wall of the small diameter portion 22a, the fluid makes swirling movements within the first chamber $R_1$ so that the fluid proceeds to the first passage 23 entraining therewith the air existing within the first chamber $R_1$. The air with the fluid flows into the valve chamber 25 through the first passage 23. The air then passes through the hole 25a due to its self-buoyancy and the flow of the fluid. Subsequently, this air combines with the air remaining in the upper portion of the valve chamber 25 and flows into the second chamber $R_2$ through the bypass passage 26 and the second passage 24. The air then passes together with the fluid through the outlet port 21b and the conduit 18 to reach the rear wheel brake cylinders 14, finally to be drained out with the fluid from the bleed plugs. After the air-purging process is completed within the hydraulic circuit for the rear wheel brake cylinders 14, the bleed plugs are closed as well as the screw plug 33 to close the check valve 30, so as to effect the braking features as described hereinafter.

Under the unloaded condition of the vehicle, depression of the brake pedal 13 produces fluid pressure within the respective pressure chambers 11 and 12 of the master cylinder 10. The pressure in the front pressure chamber 11 is applied directly to the front wheel brake cylinder 15 through the conduit 16, and the pressure in the rear pressure chamber 12 is applied to the inlet port 21a of the control device 20 through the conduit 17. The master cylinder pressure $P_m$ applied to the inlet port 21a is applied to the second fluid chamber $R_2$ via the first chamber $R_1$, the first passage 23, the valve chamber 25, the valve seat 45 and the second passage 24 in sequence and, then, applied to the rear wheel brake cylinders 14 through the outlet port 21b and the conduit 18 to operate the rear wheel brakes. Thus, the vehicle is braked in accordance with the value of the master cylinder pressure $P_m$ applied to the front and rear wheel brake cylinders 15 and 14.

In this braking operation, within the control device 20, the small diameter piston 41 is urged forwardly by the pressure in the first chamber $R_1$ and the large diameter piston 42 is urged rearwardly by the pressure in the second chamber $R_2$. In this instance, the rearward movement of the piston 42 is restricted by the resilient force of the coil spring 43. When the rate of deceleration of the vehicle exceeds a predetermined value, the ball 44 rolls forwardly toward the valve seat 45 due to the inertia force acting thereon so that the cut-off valve V is closed to interrupt the fluid communication between the valve chamber 25 and the second passage 24, which is indicated by a character A in FIG. 2. At this stage, even when the master cylinder pressure $P_m$ increases, the small and large diameter pistons 41 and 42 do not move forwardly, and the wheel cylinder pressure $P_w$ in the second chamber $R_2$ does not increase. The ball 44 is held on the valve seat 45 due to the inertia and the difference in pressure between the valve chamber 25 and the second chamber $R_2$.

When the master cylinder pressure $P_m$ increases up to a predetermined value $P_1$ and also the pressure difference reaches a predetermined value $P_0$ between the valve chamber 25 and the second chamber $R_2$, the valve member 31 of the check valve 30 is separated from the valve seat 26a against the resilient force of the spring 32 to temporarily provide direct fluid communication between the valve chamber 25 and the second chamber $R_2$. The open and close of the check valve 30 is repeated in accordance with the increase of the master cylinder pressure $P_m$ so that the pressure in the rear wheel brake cylinders 14 increases as shown by a segment line B–C in FIG. 2

Under the loaded condition of the vehicle, when the brake pedal 13 is depressed to apply the master cylinder pressure $P_m$ from the master cylinder 10 to the front and rear wheel brake cylinders 15 and 14 in the same process as described above, the large diameter piston 42 moves rearwardly toward the first chamber $R_1$ against the resilient force of the coil spring 43 due to the pressure in the second chamber $R_2$. In this braking operation, when the inertia force acting on the ball 44 exceeds the predetermined value, the ball 44 rolls forwardly up the bottom of the valve chamber 25 to close the cut-off valve V so that the fluid communication between the valve chamber 25 and the second chamber $R_2$ is blocked, which is indicated by a character a in FIG. 2. If the master cylinder pressure $P_m$ increases by continued depression of the brake pedal 13, the large diameter piston 42 is moved forwardly toward the outlet port 21b due to the fluid pressure acting on the small diameter piston 41 and return force of the spring 43. Thus, the large diameter piston 42 acts to gradually increase the wheel cylinder pressure $P_w$ in the conduit 18, as shown by a segment line a-b in FIG. 2. The increase of the wheel cylinder pressure $P_w$ will continue until the large diameter piston 42 abuts against the end wall of the second chamber $R_2$. After abutment with the end wall of the chamber $R_2$, the wheel cylinder pressure $P_w$ is maintained at a constant value, as shown by a segment line b-c in FIG. 2.

Thereafter, when the master cylinder pressure $P_m$ increases up to a predetermined value $P_2$ and also the pressure difference reaches the predetermined value $P_0$ between the valve chamber 25 and the second chamber $R_2$, the same as described above, the valve member 31 of the check valve 30 is separated from the valve seat 26a against the resilient force of the spring 32 to temporarily permit direct fluid communication between the valve chamber 25 and the second chamber $R_2$. The open and close of the check valve 30 is repeated in accordance with the increase of the master cylinder pressure $P_m$ so that the pressure in the rear wheel brake cylinders 14 increases as shown by a segment line c-d in FIG. 2.

Figure 3:
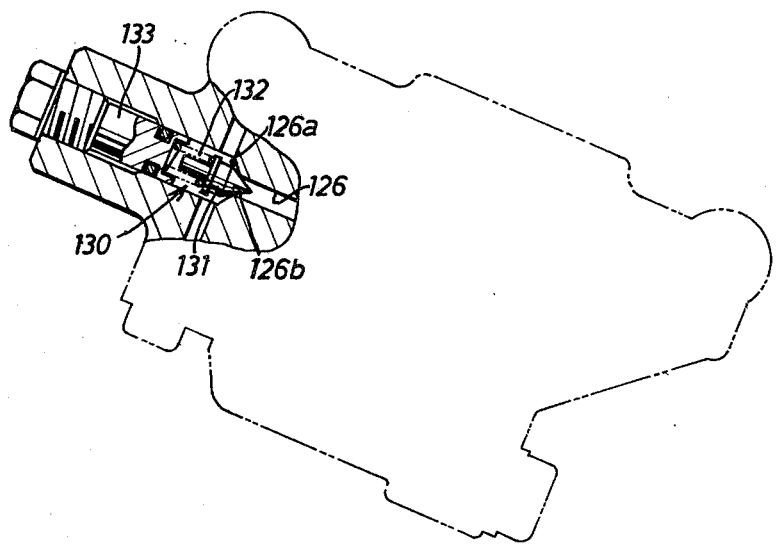
FIG. 3 illustrates a modification of the fluid pressure control device.

In FIG. 3, there is illustrated a modification of the control device 20 in which a check valve assembly 130 corresponds with the check valve 30 and a bypass passage 126 corresponds with the bypass passage 26. The check valve assembly 130 includes a valve seat 126a provided within the bypass passage 126 and a valve member 131 co-operable with the valve seat 126. The valve member 131 is biased toward the valve seat 126a by a compression coil spring 132, which is supported at one end thereof by a screw plug 133. The screw plug 133 is adjustably threaded into the housing to temporarily open the check valve 130 when brake fluid is being charged into the vehicle braking system.

Figure 4:
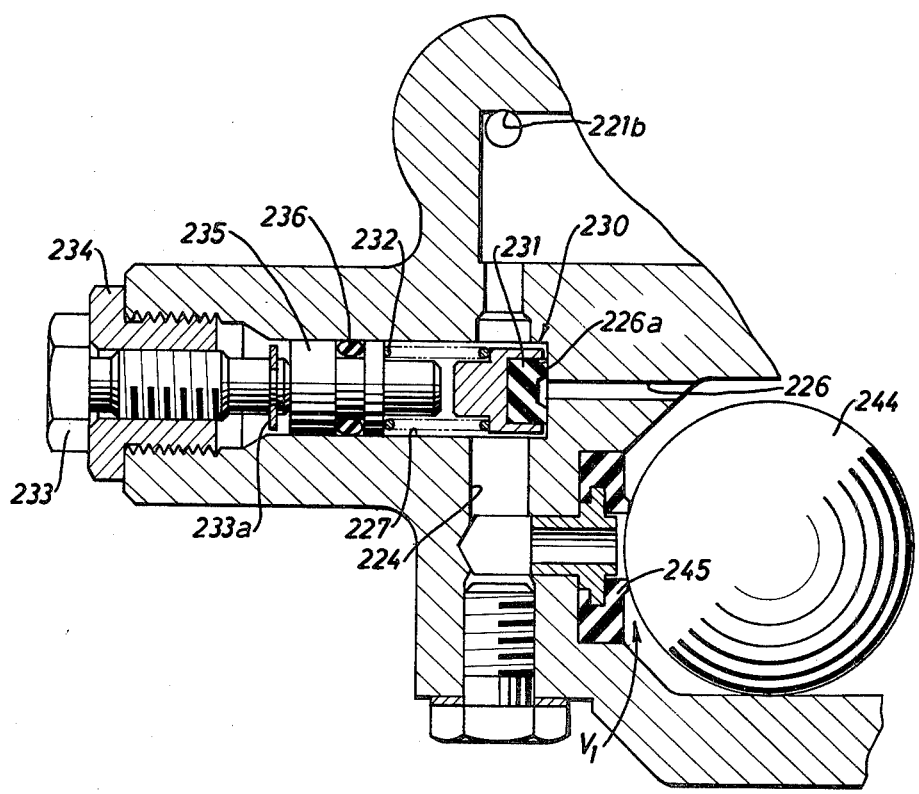
FIG. 4 illustrates another modification of the fluid pressure control device.

Furthermore, in an actual practice of the present invention, a modified check valve assembly 230 is preferably adapted to the control device 20, as shown in FIG. 4. The check valve assembly 230 is provided within a cylindrical bore 227 and comprises a valve seat 226a formed on an inner shoulder of the bore 227 and a valve member 231 co-operable with the valve seat 226a. The cylindrical bore 227 is opened into a bypass passage 226 to permit direct fluid flow from the upper portion of a valve chamber to an outlet port 221b, similar to the control device 20 shown in FIG. 1. An inertia-controlled ball 244 corresponds with the ball 44 of the control device 20 and is co-operable with a valve seat 245 to provide a cut-off valve $V_1$. The cut-off valve $V_1$ corresponds with the cut-off valve V of FIG. 1 and serves to interrupt the flow of fluid passing through a passage 224, connecting the valve chamber to the outlet port 221b.

In the check valve assembly 230, the valve member 231 is biased by a compression spring 232 in a rightward direction for engagement with the valve seat 226a. The spring 232 is engaged at one end thereof with the valve member 231 and at the other end thereof with a movable member 235. The movable member 235 is reciprocably engaged within the bore 227 through an annular seal member 236 and is supported in a position by a screw plug 233 so that the spring 232 is compressed to maintain the engagement of the valve member 231 with the valve seat 226a. The screw plug 233 is adjustably threaded into a fixed plug 234 and provided at the leading end thereof with an annular stopper 233a. The fixed plug 234 is rigidly threaded into the housing to support the screw plug 233.

When supplying brake fluid into the braking system, prior to supply of brake fluid, the screw plug 233 is turned back outwardly to retract the movable member 235 from the position and, in turn, the valve member 231 is released from loading of the spring 232 to temporarily open the check valve 230. In this instance, the outward movement of the screw 233 is restricted by abutment of the stopper 233a against the inner end of the fixed screw 234, and the retraction of the movable member 235 is conducted only in the axial direction to avoid damage to the seal member 236 which otherwise could be caused by rotation of the movable member 235 with screw plug 233.

In addition, although in the above description the present invention is adapted to a fluid pressure control device having a differential piston and an inertia-controlled valve, it should be recognized that the present invention may be adapted to various fluid pressure control devices having an inertia-controlled valve without the differential piston.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A fluid pressure control device for incorporation in a vehicle braking system between a master cylinder and a wheel brake cylinder, the device including
    a housing provided with an inlet port for connection to said master cylinder, an outlet port for connection to said wheel brake cylinder, and a valve chamber communicating at one end thereof with said inlet port and at the other end thereof with said outlet port;
    a valve seat provided in said valve chamber to permit the flow of fluid between said inlet and outlet ports therethrough; and
    an inertia-controlled valve element located within said valve chamber to co-operate with said valve seat to cut off the flow of fluid from said inlet port to said outlet port when said valve element is subjected to a deceleration in excess of a predetermined value;

a bypass air bleed passage to permit direct fluid flow from the top of said valve chamber into said outlet port;

bypass valve means disposed within said bypass passage to normally interrupt the direct flow of fluid from said valve chamber to said outlet port; and manually operable means for opening said bypass valve means to permit bleeding air from the upper part of said valve chamber when brake fluid is being charged into the braking system, wherein the improvement comprises:

said bypass valve means incorporates a check valve means, said check valve means being biased to open for allowing direct flow of fluid from said valve chamber to said outlet port only when a predetermined pressure difference is produced between said valve chamber and said outlet port after said inertia-controlled valve element co-operates with said valve seat.

2. A fluid pressure control device as claimed in claim 1, wherein said manually operable means comprises a screw plug adjustably threaded into said housing and associated with said check valve means, said screw plug being adapted to be manually unscrewed to open said check valve means when brake fluid is being charged into the vehicle braking system.

3. A fluid pressure control device as claimed in claim 1, further comprising a differential piston slidably disposed within said housing in parallel with said valve chamber to form first and second fluid chambers communicating with said inlet and outlet ports respectively, the smaller end of said piston being exposed in said first chamber and the larger end in said second chamber; and a spring biasing said piston, in the axial direction thereof, toward the outlet port.

4. A fluid pressure control device as claimed in claim 3, wherein said differential piston is normally engaged at the larger end thereof with the end wall of said second chamber due to biasing force of said spring.

5. A fluid pressure control device as claimed in claim 1, wherein said check valve means comprises a valve seat provided within said bypass passage; a valve member co-operating with said second named valve seat to normally interrupt the direct flow of fluid from said valve chamber to said outlet port; a movable member reciprocable within a bore extending coaxially with said bypass passage; annular resilient seal means provided around the periphery of said movable member for sealing between said member and said bore; and a spring interposed between said valve member and said movable member for biasing said valve member against said second named valve seat; and said manually operable means comprises a screw plug adjustably threaded into said housing and supporting said movable member in a position to compress said spring, said screw plug being adapted to be manually unscrewed to open said check valve means without rotating said movable member, thereby avoiding damage to said resilient seal means.

6. A fluid pressure control device as claimed in claim 5, wherein said screw plug is adjustably threaded into a fixed plug mounted on said housing and includes a stopper member engageable with the inner end of said fixed plug to restrict outward movement of said screw plug to prevent unsealing disengagement of the resilient seal means of said movable member for said bore.

* * * * *

UNITED STATES PATENT AND TRADEMARK OFFICE
CERTIFICATE OF CORRECTION

PATENT NO. : 4,181,370
DATED : January 1, 1980
INVENTOR(S) : Tomoyuki Nogami, et al.

It is certified that error appears in the above-identified patent and that said Letters Patent are hereby corrected as shown below:

Correct inventor's last name from "Noeami" to --Nogami--.

Figure 2:
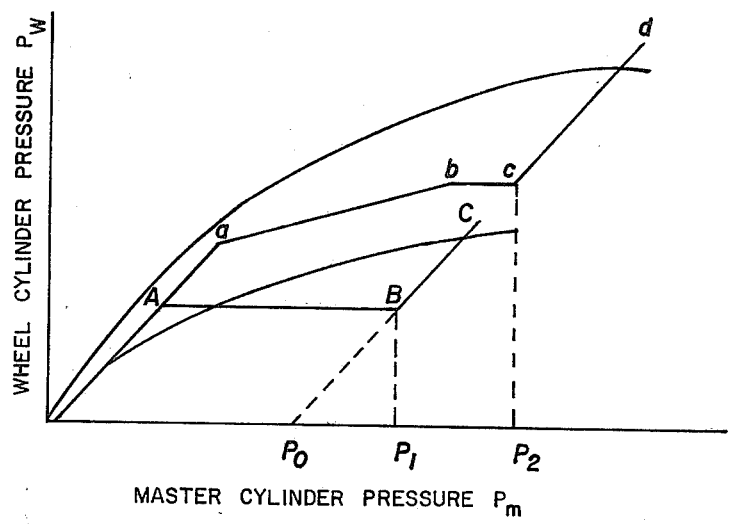
FIG. 2 is a graph indicating the pressure control characteristics of the control device.

Col. 4, line 68, after "Fig. 2" insert -- . --.

Signed and Sealed this

Sixth Day of May 1980

[SEAL]

Attest:

SIDNEY A. DIAMOND

Attesting Officer     Commissioner of Patents and Trademarks